United States Patent
Mäkelä et al.

(10) Patent No.: US 9,402,055 B2
(45) Date of Patent: Jul. 26, 2016

(54) SYSTEMS AND METHODS FOR PERIPHERAL AWARENESS OF, AND NOMINAL INTERACTION WITH, A REMOTE MEETING USING A WEARABLE DEVICE

(71) Applicant: FUJI XEROX CO., LTD., Tokyo (JP)

(72) Inventors: Ville Mäkelä, Tampere (FI); Jennifer Marlow, Palo Alto, CA (US); Scott Carter, Mountain View, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/856,535

(22) Filed: Sep. 16, 2015

(65) Prior Publication Data
US 2016/0006983 A1    Jan. 7, 2016

Related U.S. Application Data

(63) Continuation-in-part of application No. 14/052,532, filed on Oct. 11, 2013, now Pat. No. 9,179,096.

(51) Int. Cl.
| | |
|---|---|
| *H04N 7/15* | (2006.01) |
| *G06F 1/16* | (2006.01) |
| *G06F 3/16* | (2006.01) |
| *G06F 3/0481* | (2013.01) |
| *H04N 7/14* | (2006.01) |
| *G06F 3/01* | (2006.01) |

(52) U.S. Cl.
CPC ............... *H04N 7/15* (2013.01); *G06F 1/163* (2013.01); *G06F 3/017* (2013.01); *G06F 3/0481* (2013.01); *G06F 3/167* (2013.01); *H04N 7/147* (2013.01); *G06F 2203/04806* (2013.01); *G06F 2203/04808* (2013.01)

(58) Field of Classification Search
USPC ........................................................ 348/14.03
See application file for complete search history.

(56) References Cited

U.S. PATENT DOCUMENTS

| 6,363,380 | B1* | 3/2002 | Dimitrova | G06F 17/30787 707/740 |
|---|---|---|---|---|
| 8,970,662 | B2* | 3/2015 | Kerger | H04W 76/005 348/14.02 |
| 2003/0030852 | A1* | 2/2003 | Sampson | G11B 19/022 358/479 |
| 2005/0041029 | A1* | 2/2005 | Felt | G06T 13/80 345/473 |

(Continued)

OTHER PUBLICATIONS

WebEx mobile. http://www.webex.com/products/web-conferencing/mobile.html. Visited on Mar. 16, 2016.

(Continued)

*Primary Examiner* — Creighton Smith
(74) *Attorney, Agent, or Firm* — TransPacific Law Group; Pavel I. Pogodin, Esq.

(57) ABSTRACT

Provided is a system and associated method that allow meeting participants to maintain a basic awareness of the audio and visual content of a meeting using a wearable device, such as a smartwatch, well known to persons of ordinary skill in the art. Embodiments of the described system and method also provide essential interaction mechanisms such that the remote, mobile users can interact with the distributed meeting without distracting them from their other tasks. In one embodiment, the described techniques provide an unobtrusive way for users to participate in ongoing distributed meetings using a smartwatch-based interface for a video conferencing application.

21 Claims, 5 Drawing Sheets

(56) References Cited

U.S. PATENT DOCUMENTS

| | | | |
|---|---|---|---|
| 2007/0038935 A1* | 2/2007 | Hull | G06F 17/30038 715/706 |
| 2013/0271472 A1* | 10/2013 | Duran | G06T 13/80 345/473 |
| 2014/0267543 A1* | 9/2014 | Kerger | H04W 76/005 348/14.02 |
| 2014/0270482 A1* | 9/2014 | Chakraborty | G06K 9/00221 382/154 |
| 2015/0085171 A1* | 3/2015 | Kim | H04N 1/00183 348/333.04 |

OTHER PUBLICATIONS

Blue Jeans mobile. https://itunes.apple.com/us/app/blue-jeans/id560788314?mt=8. Visited on Mar. 16, 2016.

join.me mobile. https://www.join.me/mobile. Visited on Mar. 16, 2016.

GoToMeeting wearable. http://support.citrixonline.com/en_US/Meeting/knowledge_articles/000215393. Visited on Mar. 16, 2016.

Paul, S. et al. Ask an Expert: Mobile Workspaces for Collaborative Troubleshooting. In System Sciences (HICSS), 2015 48th Hawaii International Conference on (pp. 442-451) IEEE.

* cited by examiner

SYSTEMS AND METHODS FOR PERIPHERAL AWARENESS OF, AND NOMINAL INTERACTION WITH, A REMOTE MEETING USING A WEARABLE DEVICE

CROSS-REFERENCE TO RELATED PATENT APPLICATION

The present patent application relies upon, claims the benefit of priority from, and is a continuation-in-part of U.S. patent application Ser. No. 14/052,532 filed on Oct. 11, 2013, the entire disclosure of which is incorporated by reference herein.

BACKGROUND OF THE INVENTION

1. Technical Field

The disclosed embodiments relate in general to techniques for enabling collaboration between individuals and, more specifically, to systems and methods for peripheral awareness of, and nominal interaction with, a remote meeting using a wearable device.

2. Description of the Related Art

Meetings, once the exclusive domain of offices and boardrooms, are becoming increasingly distributed across space, time, and devices. Such distributed meetings primarily involve groups or sets of individuals communicating from a laptop, desktop or phone-based setting where they have access to the technical infrastructure needed to communicate and share information. However, meeting participants cannot easily maintain awareness of these meetings if they are traveling, commuting, or located off-site (for example, in a waiting room at a doctor's office). Thus, in order for distributed meetings to be successful, the way that meeting participants and their shared files, screens, and other materials are represented must adapt to each participant's individual context.

Accordingly, as would be appreciated by persons of ordinary skill in the art, a lightweight, unobtrusive tool for enabling an individual to participate in an ongoing distributed meeting would be highly desirable.

SUMMARY OF THE INVENTION

The embodiments described herein are directed to methods and systems that substantially obviate one or more of the above and other problems associated with conventional collaboration techniques.

In accordance with one aspect of the inventive concepts described herein, there is provided a computer-implemented method performed on a wearable device worn by a user in connection with a meeting between a plurality of participants, the wearable device incorporating a processing unit, a memory and a display, the computer-implemented method involving: extracting a plurality of keyframes from each of a plurality of live meeting streams; displaying one of a plurality of keyframes from one of the plurality of streams to the user on the display device; detecting input from the user; if the detected input from the user is of a first type, displaying another one of a plurality of keyframes from the one of the plurality of streams; and if the detected input from the user is of a second type, displaying one of a plurality of keyframes from another one of the plurality of streams.

In one or more embodiments, the user input of a first type comprises a user gesture in a first direction.

In one or more embodiments, the first direction is a horizontal direction.

In one or more embodiments, the user input of a second type comprises a user gesture in a second direction.

In one or more embodiments, the second direction is a vertical direction.

In one or more embodiments, the method further involves, if the detected input from the user is of a third type, zooming the displayed keyframe.

In one or more embodiments, the user input of a third type comprises a double tap gesture.

In one or more embodiments, the method further involves, if the detected input from the user is of a fourth type, showing one of the plurality of live meeting streams to the user.

In one or more embodiments, the user input of a fourth type comprises turning the display of the wearable device towards a face of the user.

In one or more embodiments, the method further involves ceasing showing one of the plurality of live meeting streams to the user when the user turns the display of the wearable device away from the face of the user.

In one or more embodiments, each of the plurality of keyframes are generated based on a difference between two keyframes in the corresponding live meeting stream.

In one or more embodiments, a keyframe is generated when the difference between two keyframes in the corresponding live meeting stream exceeds a predetermined threshold.

In one or more embodiments, the predetermined threshold is determined based on a type of content in the corresponding live meeting stream.

In one or more embodiments, the method further involves using the display device to display chat messages to the user.

In one or more embodiments, the method further involves receiving chat input from the user and transmitting the chat input to the plurality of meeting participants.

In one or more embodiments, the chat input is received from the user using a graphical user interface generated on the display.

In one or more embodiments, the graphical user interface incorporates a user-selectable 'yes' widget and 'no' widget, wherein upon selection of one of the 'yes' widget and 'no' widget, a corresponding chat input is generated.

In one or more embodiments, the chat input is received from the user by converting a speech of the user to a textual chat messages.

In one or more embodiments, the detecting input from the user involves detecting words spoken by the user and converting the detected spoken words to a corresponding user input of the first type or of the second type.

In accordance with another aspect of the inventive concepts described herein, there is provided a wearable device worn by a user, the wearable device incorporating a processing unit, a memory and a display, the memory storing a sequence of computer-executable instruction, which, when executed in connection with a meeting between a plurality of participants, cause the wearable device to perform a computer-implemented method involving: extracting a plurality of keyframes from each of a plurality of live meeting streams; displaying one of a plurality of keyframes from one of the plurality of streams to the user on the display device; detecting input from the user; if the detected input from the user is of a first type, displaying another one of a plurality of keyframes from the one of the plurality of streams; and if the detected input from the user is of a second type, displaying one of a plurality of keyframes from another one of the plurality of streams.

In accordance with another aspect of the inventive concepts described herein, there is provided a non-transitory computer-readable medium embodying a set of computer-executable instructions, which, when executed in a wearable device worn by a user incorporating a processing unit, a memory and a display in connection with a meeting between a plurality of participants, cause the wearable device to perform a method involving: extracting a plurality of keyframes from each of a plurality of live meeting streams; displaying one of a plurality of keyframes from one of the plurality of streams to the user on the display device; detecting input from the user; if the detected input from the user is of a first type, displaying another one of a plurality of keyframes from the one of the plurality of streams; and if the detected input from the user is of a second type, displaying one of a plurality of keyframes from another one of the plurality of streams.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein there are provided a system and associated method that allow meeting participants to maintain a basic awareness of the audio and visual content of a meeting using a wearable device, such as a smartwatch, well known to persons of ordinary skill in the art. Embodiments of the described system and method also provide essential interaction mechanisms such that the remote, mobile users can interact with the distributed meeting without distracting them from their other tasks. In one embodiment, the described techniques provide an unobtrusive way for users to participate in ongoing distributed meetings using a smartwatch-based interface for a video conferencing application.

In one or more embodiments, the described solution uses the concept of keyframes. Keyframes are still screen captures of a participant's shared screen during meetings, which are stored for later reference. The use of the aforesaid keyframes, which are static image captures descriptive of the content of the participant's shared screen, quickly provides the user with an idea of the current state of the video stream(s) of the distributed meeting without the need to display the realtime video stream of the meeting. This results in saving the battery life of the user's wearable device.

Figure 1A:
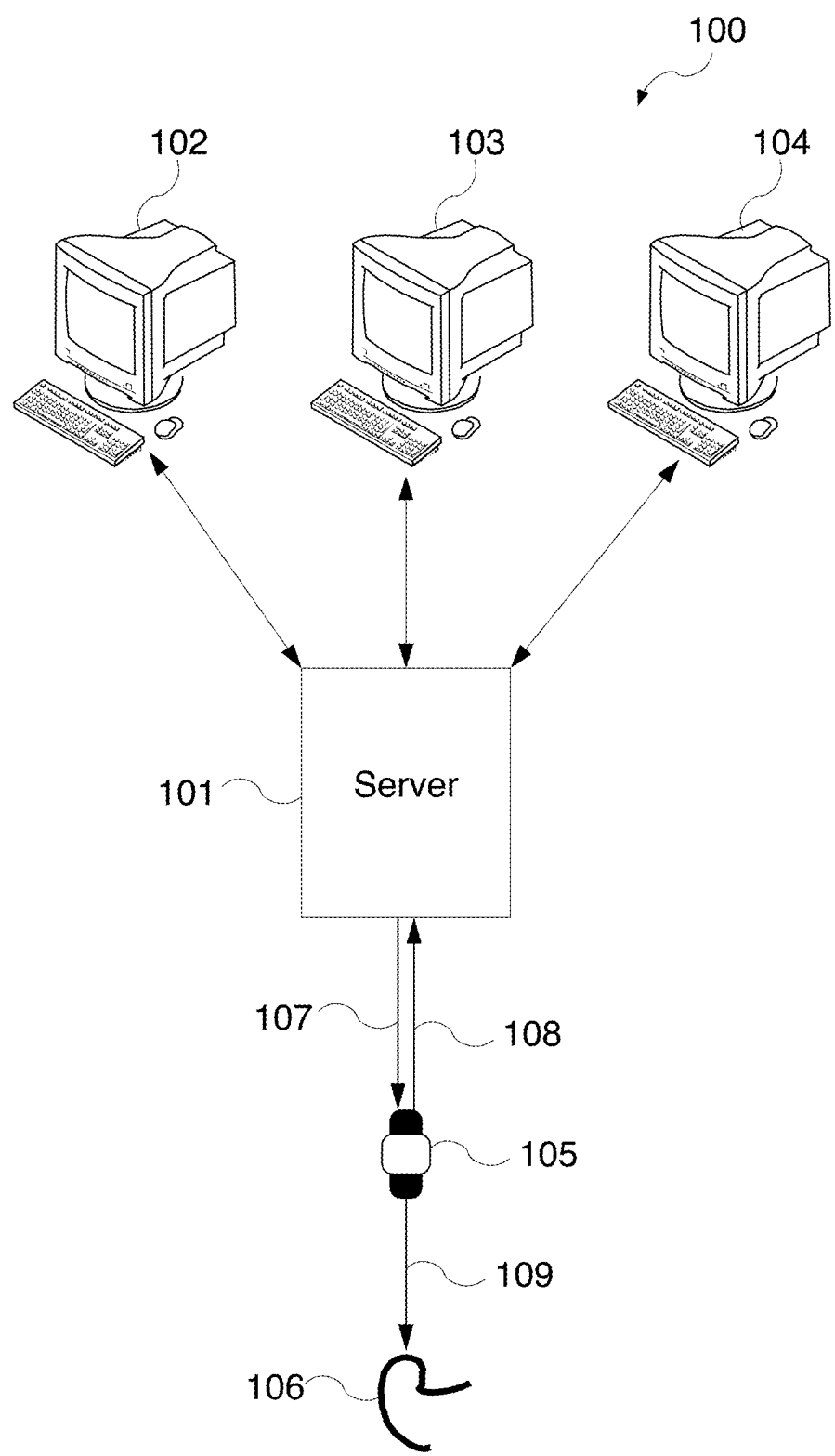
FIGS. 1(a) and 1(b) illustrate two exemplary embodiments of a system for enabling a distributed meeting of participants with at least one participant connecting to the meeting using a wearable device such as a smartwatch.
Figure 1B:
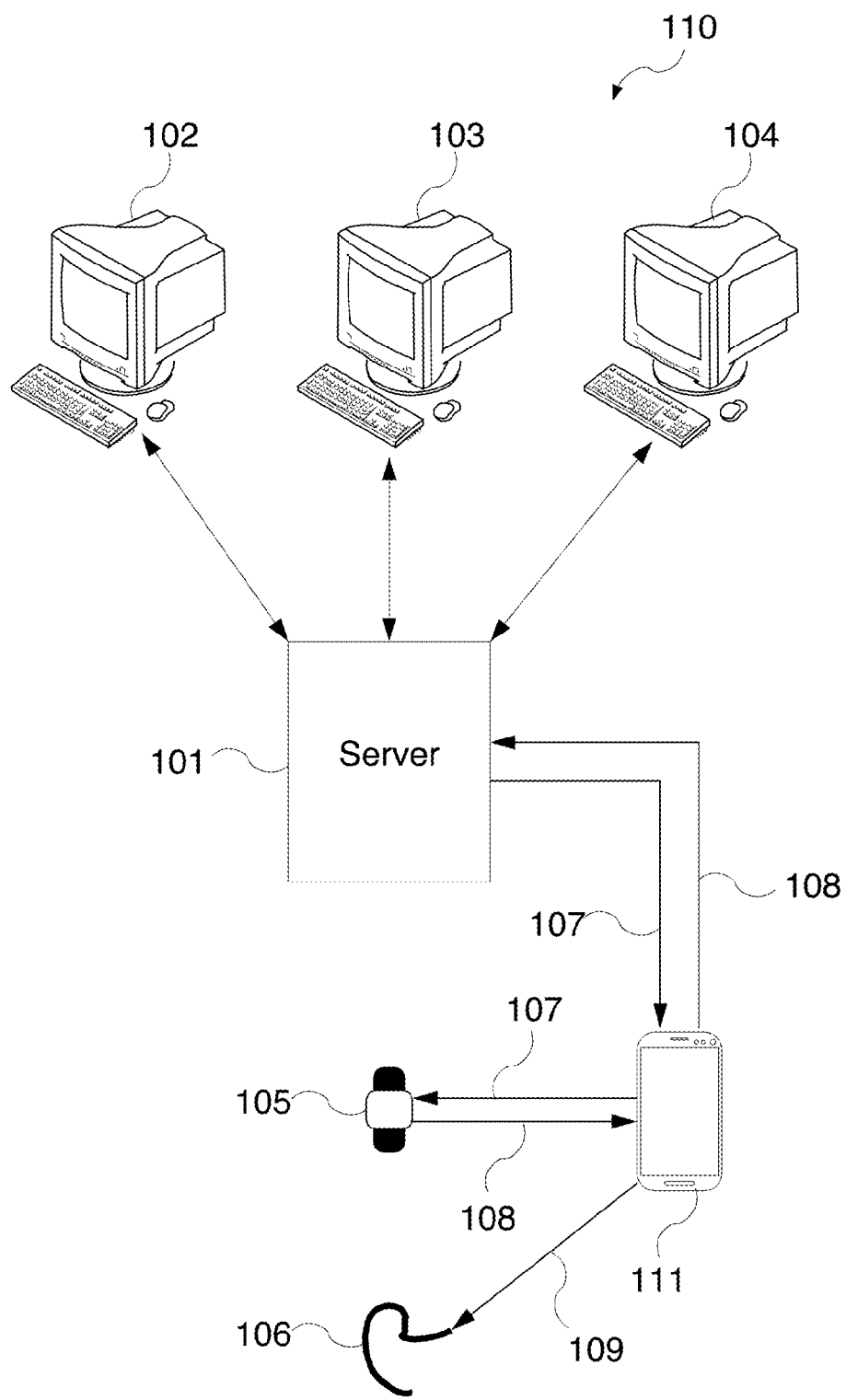

FIGS. 1(a) and 1(b) illustrate two exemplary embodiments of a system for enabling a distributed meeting of participants with at least one participant connecting to the meeting using a wearable device such as a smartwatch. An exemplary system 100 illustrated in FIG. 1(a) incorporates a central server 101, which is communicatively connected, via a computer network, with computing systems 102, 103 and 104 of the distributed meeting participants. In one or more embodiments, the data connections are implemented using HTTP protocol. The wearable device 105 worn by a meeting participant is also communicatively connected with the central server 101. In one embodiment, the computing systems 102, 103 and 104 of the meeting participants generate outgoing meeting streams, which may include, for example, video of participant's face, associated audio, chat text messages as well as content of participant's computer screen shared with the other meeting participants. In one embodiment, each of the participants' computer systems 102, 103 and 104 generates the keyframes based on the content of the participants outgoing meeting stream. The outgoing meeting streams and the generated keyframes are transmitted from each of the computing systems 102, 103 and 104 to the server 101. In another embodiment, the keyframes may be generated on the server 101 using the content of the received meeting streams.

In one or more embodiments, the audio, the generated keyframes and the chat messages (collectively 107) are transmitted from the central server 101 to the wearable device 105 via the network. In one or more embodiments, the generated keyframes and the chat messages are displayed to the user on the display of the wearable device 105. On the other hand, the received audio is transmitted (109) by the wearable device 105 to a headset 106 worn by the user using, for example, Bluetooth wireless protocol well known to persons of ordinary skill in the art. In one or more embodiments, using an inventive graphical user interface of the wearable device 105, the user is enabled to transmit chat text messages 108 back to the server 101.

In an alternative exemplary embodiment 110 illustrated in FIG. 1(b), a handheld device 111 is additionally provided. In the shown embodiment, the handheld device 111 communicates with both the central server 101 and the wearable device 105. The communication with the central server 101 may be provided using a cellular or WIFI data connection, while the communication with the wearable device 105 may be performed using Bluetooth or WIFI data connection. In one embodiment, the aforesaid audio, the generated keyframes and the chat messages (collectively 107) are first transmitted from the central server 101 to the handheld device 111, such as a smartphone. The handheld device 111, in turn, transmits the meeting audio 109 to the headset 106 worn by the user using, for example, Bluetooth wireless protocol or a wired connection, and the generated keyframes and the chat messages to the wearable device 105 for display to the user. In one or more embodiments, the handheld device 111 also handles joining the correct meeting by the user.

In one or more embodiments, the keyframes are generated on the server 101, and the parameters used in triggering keyframe generation are varied based on the type of content that the user is sharing at the particular time. In one embodiment, the keyframe generation system continually calculates and monitors the difference (distance) between the preceding and the subsequent video frames in the meeting video stream shared by each user and compares this difference (distance) with a predetermined threshold. When the threshold is exceeded, a new keyframe generation is automatically triggered. The aforesaid threshold may be different for different types of content.

For example, in one embodiment, when the user is sharing a standard Web camera (webcam) view, a certain predetermined level of change in a view (video stream) is required for a new keyframe to be generated in order to avoid identical non-relevant frames displaying e.g. a user's face. Thus, in case of video content of the user's face, the aforesaid threshold may be relatively high. On the other hand, when the meeting participant is sharing a slide show, any change in view will generate a new keyframe. Thus, the aforesaid keyframe generation threshold for slide show content may be very low.

In one or more embodiments, the generated keyframes are divided into user-specific (distributed meeting participant-specific) keyframe streams. These keyframe streams are furnished to the wearable device 105 and nay be selected by the meeting participant for viewing using the graphical user interface generated on the display of the wearable device 105. In one or more embodiments, the application executing on the wearable device 105 detects predetermined user gestures and switches between the aforesaid keyframe streams based on the detected predetermined user gestures. In one or more embodiments, the user gestures may be detected, for example, using touch-screen interface of the user-wearable device 105.

In one embodiment, a detected swiping up and down user gesture, which may be performed by the user with his or her finger or other suitable object, causes the wearable device 105 software application to change to a different user's stream and display the content (e.g. keyframes) of the so user-selected stream on the display device. On the other hand, in the same or different embodiment, the detected swiping left and right user gesture causes the wearable device 105 software application to cycle between key frames within a particular stream. Moreover, the detected double-tap user gesture zooms in and out of a keyframe. Finally, a zoomed-in frame can be panned around freely using a two-finger pinching gesture. As would be appreciated by persons of ordinary skill in the art, many other types of user gestures may be detected by the software application executing on the wearable device 105 and, therefore, the invention described herein is not limited to any specific user gestures.

Moreover, in one or more embodiments, the navigation between streams and keyframes may be accomplished using a speech recognition interface described in detail below. In this embodiment, the software application executing on the wearable device 105 detects specific spoken commands uttered by the user, such as, for example "next stream," "previous stream," "next frame," "previous frame," etc. Upon detection of a specific user-spoken command, the software application executing on the wearable device 105 executes the corresponding command. As would be appreciated by persons of ordinary skill in the art, many other types of user-spoken commands may be detected by the software application executing on the wearable device 105 and, therefore, the invention described herein is not limited to any specific spoken commands.

In one or more embodiments, whenever the latest keyframe in a meeting stream is being viewed and a new, more recent, keyframe is received by the wearable device 105 from the central server 101, the software application executing on the wearable device 105 automatically moves on to the new keyframe and displays this newly received keyframe to its user. This feature creates an automatic flow of keyframes that is up-to-date with what is being discussed in the distributed meeting, and allows the users to maintain awareness of the visual content of the meeting. In one or more embodiments, if the user currently interacts with a keyframe, such as by panning or zooming it, and a new keyframe is received from the server 101, the software application executing on the wearable device 105 does not immediately show the newly received keyframe to the user to avoid interrupting user's current activity in connection with the older keyframe.

In one or more embodiments, the software application executing on the wearable device 105 also contains a separate chat channel. The aforesaid chat channel allows users of the wearable device 105 to view chat (text) messages sent by other meeting participants and send their own messages to the meeting chat by using, for example, predefined yes/no responses provided by the graphical user interface. In another embodiment, the software application executing on the wearable device 105 incorporates a speech-to-text conversion functionality, which automatically converts user's speech to text messages sent over the aforesaid char channel to other distributed meeting participants. Software for speech to text conversion is well known to persons of ordinary skill in the art and any such software may be utilized without restricting the scope of the described invention.

Figure 2:
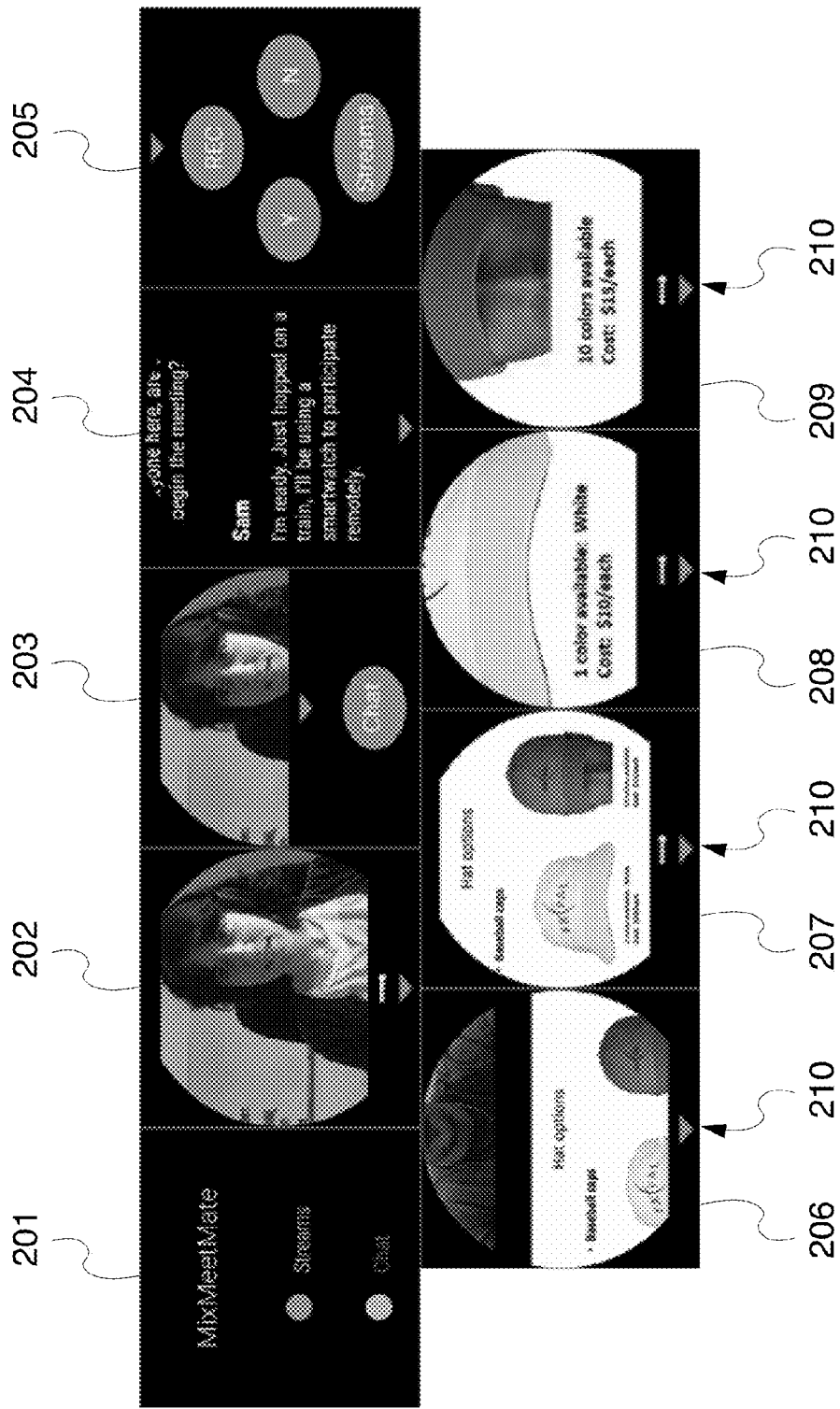
FIG. 2 illustrates various exemplary embodiments of graphical user interface screens of a software application executing on the user-wearable device.

FIG. 2 illustrates various exemplary embodiments of graphical user interface screens of a software application executing on the user-wearable device. In one or more embodiments, users of the wearable device 105 may access both the stream view and chat view from the application's graphical user interface main menu screen 201, see FIG. 2. In one or more embodiments, one or more of the subsequent screens include a panel 210 at the bottom of the screen to allow quick switching between views.

FIG. 2 further illustrates an exemplary embodiment of a stream view screen 202. Current or historical keyframes are being displayed to the user using this screen. The user is able to scroll to the next or previous keyframe using a horizontal sweeping gesture over the screen of the wearable device 105. FIG. 2 further illustrates an exemplary embodiment of a stream view screen 203 with the panel 210 opened. FIG. 2 further illustrates an exemplary embodiment of a chat view screen 204. FIG. 2 further illustrates an exemplary embodiment of a chat view screen 205 with panel 210 opened. As can be seen from FIG. 2, the chat view screen 205 includes buttons 'Y', 'N', 'Rec' and 'Streams' for speech-to-text (the 'Rec' button) and quick yes/no responses ('Y' and 'N' buttons). In addition, the 'Streams' button enables the user to navigate to the stream view screen 203.

FIG. 2 further illustrates user swiping to another stream that is displaying a slide show, see screen 206. FIG. 2 further illustrates an exemplary embodiment of a graphical user interface screen 207 displaying a slide keyframe. FIG. 2 further illustrates an exemplary embodiment of a graphical user interface screen 208 displaying a zoomed in slide keyframe. Finally, FIG. 2 further illustrates an exemplary embodiment of a graphical user interface screen 209 displaying a zoomed in slide keyframe panned to a different position. Screens 202 through 209 incorporate the aforesaid navigation panel 210.

Figure 3:
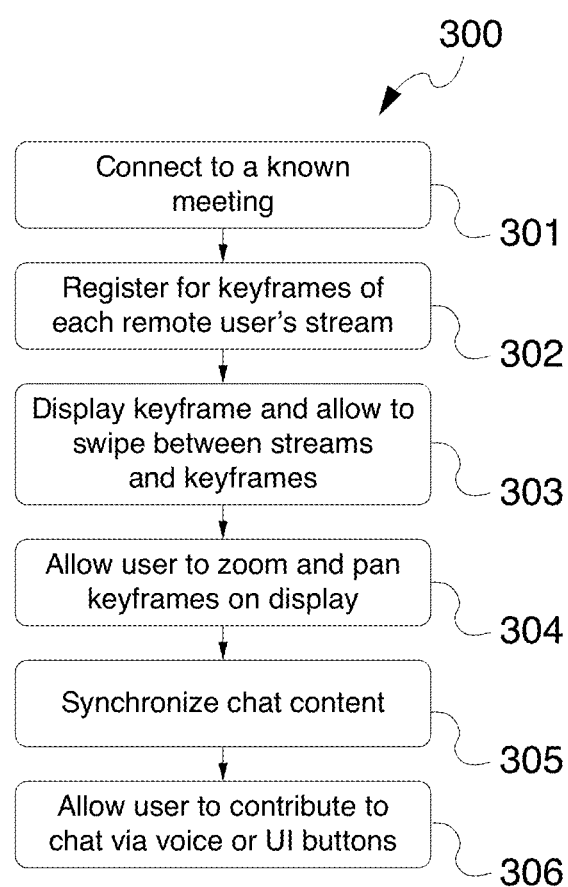
FIG. 3 illustrates an exemplary operating sequence of the software application executing on the wearable device of the user.

FIG. 3 illustrates an exemplary operating sequence of the software application executing on the wearable device 105. First, at step 301, the software application executing on the wearable device 105 connects to a known meeting. At step 302, the software application executing on the wearable device 105 registers for keyframes corresponding to each remote user's stream. At step 303, the software application executing on the wearable device 105 displays keyframes and allows the user to swipe between remote user streams as well as individual keyframes. At step 304, the software application executing on the wearable device 105 allows the user to zoom and pan keyframes on the display of the wearable device. At step 305, the software application executing on the wearable device 105 synchronizes chat content. At step 306, the software application executing on the wearable device 105 allows the user to contribute to the chat via speech-to-text or yes/no buttons. It should be noted that the above steps 302 through 306 may be executed in any suitable sequence. In one embodiment, if the wearable device is not capable of connecting with a network directly it can perform all of these functions via a middleware application running on the handheld device 111, such as a smartphone.

In one or more embodiments, the wearable device 105 may be also configured to display the live meeting stream to the user. To sale the battery, the live meeting stream may be displayed when the user turns the display of the wearable device 105 towards user's face. To this end, the wearable device 105 may be equipped with pose/orientation sensors, such as plurality of gyroscopes. In addition, the software application executing on the wearable device may be provided with note taking functionality enabling the user to dictate or otherwise input notes during the meeting.

Figure 4:
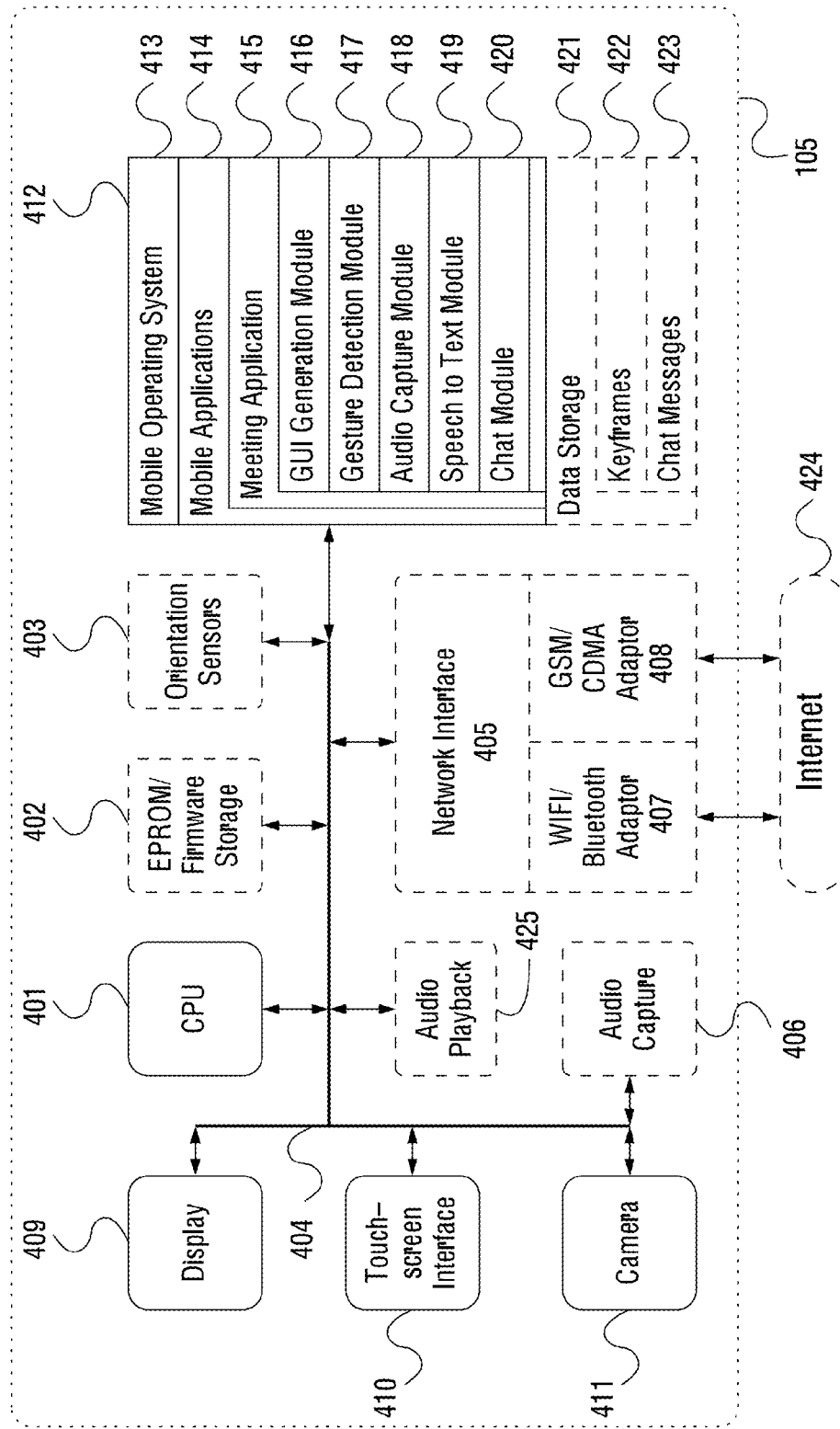
FIG. 4 illustrates an exemplary embodiment of a wearable computerized system upon which the embodiments described herein may be deployed.

FIG. 4 illustrates an exemplary embodiment of the computerized wearable system 105 upon which the embodiments described herein may be deployed. In one or more embodiments, the wearable computerized system 105 is a smartwatch.

The computerized wearable system 105 may include a data bus 404 or other interconnect or communication mechanism for communicating information across and among various hardware components of the computerized wearable system 105, and a central processing unit (CPU or simply processor) 401 electrically coupled with the data bus 404 for processing information and performing other computational and control tasks. Computerized system 105 also includes a memory 412, such as a random access memory (RAM) or other dynamic storage device, coupled to the data bus 404 for storing various information as well as instructions to be executed by the processor 401. The memory 412 may also include persistent storage devices, such as a magnetic disk, optical disk, solid-state flash memory device or other non-volatile solid-state storage devices.

In one or more embodiments, the memory 412 may also be used for storing temporary variables or other intermediate information during execution of instructions by the processor 401. Optionally, computerized wearable system 105 may further include a read only memory (ROM or EPROM) 402 or other static storage device coupled to the data bus 404 for storing static information and instructions for the processor 401, such as firmware necessary for the operation of the computerized wearable system 105, basic input-output system (BIOS), as well as various configuration parameters of the computerized wearable system 105.

In one or more embodiments, the computerized wearable system 105 may incorporate a display device 409, which may be also electrically coupled to the data bus 404, for displaying various information to a user of the computerized wearable system 105, such as keyframes and user interface screens illustrated in FIG. 2. In an alternative embodiment, the display device 409 may be associated with a graphics controller and/or graphics processor (not shown). The display device 409 may be implemented as a liquid crystal display (LCD), manufactured, for example, using a thin-film transistor (TFT) technology or as an organic light emitting diode (OLED) display, both of which are well known to persons of ordinary skill in the art. In various embodiments, the display device 409 may be incorporated into the same general enclosure with the remaining components of the computerized wearable system 105.

In one or more embodiments, the computerized wearable system 105 may further incorporate an audio playback device 425 electrically connected to the data bus 404 and configured to play various audio files, such as MPEG-3 files, or audio tracks of various video files, such as MPEG-4 files, well known to persons of ordinary skill in the art. To this end, the computerized wearable system 105 may also incorporate waive or sound processor or a similar device (not shown).

In one or more embodiments, the computerized wearable system 105 may incorporate one or more input devices, such as a touchscreen interface 410 for receiving user's tactile commands. The touchscreen interface 410 may operate based on resistive, acoustic, capacitive or other physical principles or effects well known to persons of skill in the art. The touchscreen interface 410 used in conjunction with the display device 409 enables the display device 409 to possess touchscreen functionality. Thus, the display device 409 working together with the touchscreen interface 410 may be referred to herein as a touch-sensitive display device or simply as a "touchscreen."

The computerized wearable system 105 may further incorporate camera 411 for capturing images or video of the user, which all may be coupled to the data bus 404 for communicating information, including, without limitation, images and video, as well as user commands to the processor 401.

In one or more embodiments, the computerized wearable system 105 may additionally include orientation sensors 403 configured to supply data on the current orientation as well as acceleration of the computerized wearable system 105 to the processor 401 via the data bus 404. The orientation information may be obtained using acceleration measurements in all 3 axes, including the gravity. In one or more embodiments, the orientation metadata provided by the orientation sensors 403 is continuously recorded and stored in the data storage unit 421. An audio capture module 406 may be further provided to capture spoken commands and chat messages using user's voice.

In one or more embodiments, the computerized wearable system 105 may additionally include a communication interface, such as a network interface 405 coupled to the data bus 404. The network interface 405 may be configured to establish a connection between the computerized wearable system 105 and the Internet 424 using at least one of a WIFI/Bluetooth interface 407 and/or a cellular network (GSM or CDMA) adaptor 408. The network interface 405 may be configured to enable a two-way data communication between the computerized wearable system 105 and the Internet 424. The WIFI/Bluetooth adaptor 407 may operate in compliance with 802.11a, 802.11b, 802.11g and/or 802.11n protocols as well as Bluetooth protocol well known to persons of ordinary skill in the art. In an exemplary implementation, the WIFI/Bluetooth adaptor 407 and the cellular network (GSM or CDMA) adaptor 408 send and receive electrical or electromagnetic signals that carry digital data streams representing various types of information.

In one or more embodiments, the Internet 424 typically provides data communication through one or more sub-networks to other network resources. Thus, the computerized wearable system 105 is capable of accessing a variety of network resources located anywhere on the Internet 424, such as remote media servers, web servers, other content servers as well as other network data storage resources. In one or more embodiments, the computerized wearable system 105 is configured to send and receive messages, media and other data, including application program code, through a variety of network(s) including the Internet 424 by means of the network interface 405. In the Internet example, when the computerized wearable system 105 acts as a network client, it may request code or data for an application program executing on the computerized wearable system 105. Similarly, it may send various data or computer code to other network resources.

In one or more embodiments, the functionality described herein is implemented by computerized wearable system 105 in response to processor 401 executing one or more sequences of one or more instructions contained in the memory 412. Such instructions may be read into the memory 412 from another computer-readable medium. Execution of the sequences of instructions contained in the memory 412 causes the processor 401 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 401 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 301 for execution. For example, the instructions may initially be carried on a magnetic disk from a remote computer. Alternatively, a remote computer can load the instructions into its dynamic memory and send the instructions over the Internet 424. Specifically, the computer instructions may be downloaded into the memory 412 of the computerized wearable system 105 from the foresaid remote computer via the Internet 424 using a variety of network data communication protocols well known in the art.

In one or more embodiments, the memory 412 of the computerized wearable system 105 may store any of the following software programs, applications or modules:

1. Operating system (OS) 413, which may be a mobile operating system for implementing basic system services and managing various hardware components of the computerized wearable system 105. Exemplary embodiments of the operating system 413 are well known to persons of skill in the art, and may include any now known or later developed mobile operating systems.

2. Applications 414 may include, for example, a set of software applications executed by the processor 401 of the computerized wearable system 105, which cause the computerized wearable system 105 to perform certain predetermined functions, such as the functions described above and illustrated, for example, in FIG. 3. In one or more embodiments, the applications 414 may include an inventive meeting application 415, described in detail below.

3. Data storage 421 may store, for example, keyframes 422 and chat messages 423.

In one or more embodiments, the inventive meeting application 415 incorporates a graphical user interface (GUI) generation module 416 configured to generate the described user interface on the display 409 of the computerized wearable system 105. The inventive meeting application 415 may further include a user gesture detection module 417 for detecting user's gestures performed in connection with the touchscreen 410, an audio capture module 418 for capturing user's spoken words, a speech to text module 419 for converting the captured audio to commands and chat messages and chat module for enabling the chat functionality described in detail above.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for peripheral awareness of, and nominal interaction with, a remote meeting using a wearable device. It is intended that the specification and examples be considered as exemplary only, with a true scope and spirit of the invention being indicated by the following claims.

What is claimed is:

1. A computer-implemented method performed on a wearable device worn by a user in connection with a meeting between a plurality of participants, the wearable device comprising a processing unit, a memory and a display, the computer-implemented method comprising:

a. extracting a plurality of keyframes from each of a plurality of live meeting streams;
b. displaying one of a plurality of keyframes from one of the plurality of streams to the user on the display device;
c. detecting input from the user;
d. if the detected input from the user is of a first type, displaying another one of a plurality of keyframes from the one of the plurality of streams; and
e. if the detected input from the user is of a second type, displaying one of a plurality of keyframes from another one of the plurality of streams.

2. The computer-implemented method of claim 1, wherein the user input of a first type comprises a user gesture in a first direction.

3. The computer-implemented method of claim 2, wherein the first direction is a horizontal direction.

4. The computer-implemented method of claim 1, wherein the user input of a second type comprises a user gesture in a second direction.

5. The computer-implemented method of claim 4, wherein the second direction is a vertical direction.

6. The computer-implemented method of claim 1, further comprising, if the detected input from the user is of a third type, zooming the displayed keyframe.

7. The computer-implemented method of claim 6, wherein the user input of a third type comprises a double tap gesture.

8. The computer-implemented method of claim 1, further comprising, if the detected input from the user is of a fourth type, showing one of the plurality of live meeting streams to the user.

9. The computer-implemented method of claim 8, wherein the user input of a fourth type comprises turning the display of the wearable device towards a face of the user.

10. The computer-implemented method of claim 8, further comprising ceasing showing one of the plurality of live meeting streams to the user when the user turns the display of the wearable device away from the face of the user.

11. The computer-implemented method of claim 1, wherein each of the plurality of keyframes are generated based on a difference between two keyframes in the corresponding live meeting stream.

12. The computer-implemented method of claim 11, wherein a keyframe is generated when the difference between two keyframes in the corresponding live meeting stream exceeds a predetermined threshold.

13. The computer-implemented method of claim 12, wherein the predetermined threshold is determined based on a type of content in the corresponding live meeting stream.

14. The computer-implemented method of claim 1, further comprising using the display device to display chat messages to the user.

15. The computer-implemented method of claim 1, further comprising receiving chat input from the user and transmitting the chat input to the plurality of meeting participants.

16. The computer-implemented method of claim 15, wherein the chat input is received from the user using a graphical user interface generated on the display.

17. The computer-implemented method of claim 16, wherein the graphical user interface comprises at least one user-selectable widget, wherein upon selection of the user-selectable widget by the user, a corresponding chat input is generated.

18. The computer-implemented method of claim 15, wherein the chat input is received from the user by converting a speech of the user to a textual chat messages.

19. The computer-implemented method of claim 11, wherein detecting input from the user comprises detecting words spoken by the user and converting the detected spoken words to a corresponding user input of the first type or of the second type.

20. A wearable device worn by a user, the wearable device comprising a processing unit, a memory and a display, the memory storing a sequence of computer-executable instruction, which, when executed in connection with a meeting between a plurality of participants, cause the wearable device to perform a computer-implemented method comprising:
a. extracting a plurality of keyframes from each of a plurality of live meeting streams;
b. displaying one of a plurality of keyframes from one of the plurality of streams to the user on the display device;
c. detecting input from the user;
d. if the detected input from the user is of a first type, displaying another one of a plurality of keyframes from the one of the plurality of streams; and
e. if the detected input from the user is of a second type, displaying one of a plurality of keyframes from another one of the plurality of streams.

21. A non-transitory computer-readable medium embodying a set of computer-executable instructions, which, when executed in a wearable device worn by a user comprising a processing unit, a memory and a display in connection with a meeting between a plurality of participants, cause the wearable device to perform a method comprising:
a. extracting a plurality of keyframes from each of a plurality of live meeting streams;
b. displaying one of a plurality of keyframes from one of the plurality of streams to the user on the display device;
c. detecting input from the user;
d. if the detected input from the user is of a first type, displaying another one of a plurality of keyframes from the one of the plurality of streams; and
e. if the detected input from the user is of a second type, displaying one of a plurality of keyframes from another one of the plurality of streams.

* * * * *